United States Patent
Mabuchi et al.

(10) Patent No.: US 8,443,595 B2
(45) Date of Patent: May 21, 2013

(54) ADDITIVE-AGENT DIFFUSION PLATE IN EXHAUST PASSAGE, STRUCTURE OF ADDITIVE-AGENT DIFFUSION PLATE, AND EXHAUST SYSTEM INCLUDING ADDITIVE-AGENT DIFFUSION PLATE

(75) Inventors: Tomoki Mabuchi, Toyota (JP); Toshio Murata, Toyota (JP); Atsushi Inomata, Aichi-ken (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1293 days.

(21) Appl. No.: 12/205,255

(22) Filed: Sep. 5, 2008

(65) Prior Publication Data

US 2009/0064669 A1 Mar. 12, 2009

(30) Foreign Application Priority Data

Sep. 7, 2007 (JP) ................................. 2007-232995

(51) Int. Cl.
 *F01N 1/00* (2006.01)
 *F01N 3/02* (2006.01)
(52) U.S. Cl.
 USPC .............................................. 60/324; 60/317
(58) Field of Classification Search
 USPC .................... 60/286, 295, 303, 324, 317
 See application file for complete search history.

(56) References Cited

U.S. PATENT DOCUMENTS

| | | | | |
|---|---|---|---|---|
| 4,893,468 A | * | 1/1990 | Hines | 60/775 |
| 7,533,520 B2 | * | 5/2009 | Cheng et al. | 60/286 |
| 2006/0191254 A1 | * | 8/2006 | Bui et al. | 60/286 |
| 2007/0204751 A1 | * | 9/2007 | Wirth et al. | 96/290 |
| 2008/0295497 A1 | * | 12/2008 | Kornherr et al. | 60/286 |

FOREIGN PATENT DOCUMENTS

| | | |
|---|---|---|
| JP | 03-68516 U | 7/1991 |
| JP | 07-227528 A | 8/1995 |
| JP | 10-165769 A | 6/1998 |
| JP | 2005-113688 A | 4/2005 |

* cited by examiner

*Primary Examiner* — Kenneth Bomberg
*Assistant Examiner* — Dapinder Singh
(74) *Attorney, Agent, or Firm* — Sughrue Mion, PLLC

(57) ABSTRACT

In a structure of an additive-agent diffusion plate in an exhaust passage, the exhaust passage is an exhaust passage for an engine. The additive-agent diffusion plate includes a plurality of collision portions; and a plurality of communication portions that allow exhaust gas flowing in the exhaust passage to flow from an area upstream of the additive-agent diffusion plate to an area downstream of the additive-agent diffusion plate in an exhaust-gas flow direction. The additive-agent diffusion plate diffuses an additive agent injected into the exhaust passage, at a position upstream of an exhaust gas purification device, which is disposed in the exhaust passage, in the exhaust-gas flow direction. Each of the collision portions protrudes toward an upstream side in the exhaust-gas flow direction, and a cross section of each of the collision portions increases from the upstream side toward a downstream side of the exhaust-gas flow direction.

17 Claims, 5 Drawing Sheets

ADDITIVE-AGENT DIFFUSION PLATE IN EXHAUST PASSAGE, STRUCTURE OF ADDITIVE-AGENT DIFFUSION PLATE, AND EXHAUST SYSTEM INCLUDING ADDITIVE-AGENT DIFFUSION PLATE

INCORPORATION BY REFERENCE

The disclosure of Japanese Patent Application No. 2007-232995 filed on Sep. 7, 2007 including the specification, drawings and abstract is incorporated herein by reference in its entirety.

BACKGROUND OF THE INVENTION

1. Field of the Invention

The invention relates to an additive-agent diffusion plate that diffuses an additive agent injected into an exhaust passage for an engine, at a position upstream of an exhaust gas purification device disposed in the exhaust passage, a structure of the additive-agent diffusion plate, and an exhaust system including the additive-agent diffusion plate.

2. Description of the Related Art

Exhaust gas discharged from an engine, particularly, a diesel engine, generally contains pollutants generated by combustion, for example, nitrogen oxides (hereinafter, referred to as NOx) such as nitrogen monoxide. To prevent air pollution, it is strongly required to reduce the amount of such pollutants discharged from the diesel engine. NOx may be discharged, together with exhaust gas, from a direct injection gasoline engine in which gasoline is injected directly into a combustion chamber, depending on an operating condition. Therefore, it is also required to reduce the amount of the pollutants discharged from the direct injection gasoline engine.

Thus, an exhaust gas purification device that includes a three-way catalyst is provided in an exhaust passage, to purify NOx discharged together with the exhaust gas.

However, the exhaust gas purification device including the three-way catalyst may not sufficiently purify NOx, depending on the type of the engine. For example, when employing a lean-burn diesel engine, the exhaust gas contains excessive oxygen, and therefore, a fuel component (HC) easily reacts with the oxygen (i.e., the fuel component (HC) is easily combusted). Thus, it is difficult for the three-way catalyst to sufficiently purify NOx.

Accordingly, for example, Japanese Utility Model Application Publication No. 3-68516 (JP-U-03-68516) describes a technology in which an exhaust gas purification device including a zeolitic catalyst is provided in an exhaust passage, and a fuel component (HC component) is supplied to exhaust gas, at a position upstream of the exhaust gas purification device, to efficiently purify NOx.

Also, for example, Japanese Patent Application Publication No. 2005-113688 (JP-A-2005-113688) describes a technology in which an exhaust gas purification device including a selective reduction NOx catalyst is provided in an exhaust passage, and urea is supplied to exhaust gas, at a position upstream of the exhaust gas purification device, to efficiently purify NOx in the exhaust gas.

The additive agent, such as the fuel component or the urea, needs to be efficiently diffused in the exhaust gas, to increase NOx purification performance of the exhaust gas purification device.

Thus, for example, Japanese Patent Application Publication No. 10-165769 (JP-A-10-165769) describes a technology in which a rectifying lattice, which includes a gas mixing promoter that promotes mixing of exhaust gas and an additive agent (a fuel component or a urea aqueous solution), is provided in an exhaust passage, at a position between a position from which the additive agent is supplied, and an exhaust gas purification device. The rectifying lattice stands in a direction substantially perpendicular to a direction in which the exhaust gas flows, and occupies an entire cross section of the exhaust passage. Thus, the rectifying lattice efficiently diffuses the additive agent in the exhaust gas.

In the technology described in the above-described publication, the gas mixing promoter is provided in at least one section of the additive-agent diffusion plate such as the rectifying lattice. Therefore, if the additive-agent diffusion plate is mounted in the exhaust passage in a manner such that the additive-agent diffusion plate is displaced in a circumferential direction, the gas mixing promoter may be displaced from the intended section. In this case, the additive agent cannot be efficiently diffused.

Further, the additive-agent diffusion plate is formed by combining partition plates in a vertical direction and a horizontal direction. In addition, the gas mixing promoter is constituted by a gas swirl generator that protrudes to face the flow of the exhaust gas, and a gas agitator that is bent in an inverted V-shape to face the flow of the exhaust gas. Therefore, the additive-agent diffusion plate has an extremely complicated structure.

SUMMARY OF THE INVENTION

The invention provides an additive-agent diffusion plate in an exhaust passage, which has a simple configuration, and which efficiently diffuses an additive agent injected into the exhaust passage to ensure sufficient performance of diffusing the additive agent in exhaust gas, a structure of the additive-agent diffusion plate, and an exhaust system including the additive-agent diffusion plate.

A first aspect of the invention relates to an additive-agent diffusion plate structure in an exhaust passage for an engine. The additive-agent diffusion plate structure has an additive-agent diffusion plate that includes: a plurality of collision portions with which the additive agent injected into the exhaust passage collides; and a plurality of communication portions that allow exhaust gas flowing in the exhaust passage to flow from an area upstream of the additive-agent diffusion plate in an exhaust-gas flow direction in which the exhaust gas flows, to an area downstream of the additive-agent diffusion plate in the exhaust-gas flow direction. The additive-agent diffusion plate diffuses an additive agent injected into the exhaust passage, at a position upstream of an exhaust gas purification device disposed in the exhaust passage in the exhaust-gas flow direction. Each of the collision portions protrudes toward an upstream side in the exhaust-gas flow direction, and a cross section of each of the collision portions increases from the upstream side toward a downstream side in the exhaust-gas flow direction.

With the above-described configuration, the additive agent injected into the exhaust passage collides with the plurality of the collision portions that protrude from the additive-agent diffusion plate toward the upstream side in the exhaust-gas flow direction, and thus, the additive agent is diffused. Because the cross section of each collision portion increases from the upstream side toward the downstream side in the exhaust-gas flow direction, the additive agent injected into the exhaust passage collides with each collision portion at a certain angle. Accordingly, the additive agent is smoothly atomized using energy generated due to the collision. Thus, it is possible to efficiently diffuse the additive agent in the exhaust gas.

Further, the additive-agent diffusion plate includes the plurality of the collision portions and the plurality of the communication portions. Therefore, even if the additive-agent diffusion plate is mounted in the exhaust passage in a manner such that the additive-agent diffusion plate is displaced in a circumferential direction, the additive agent injected into the exhaust passage smoothly collides with each collision portion. Thus, it is possible to efficiently diffuse the additive agent regardless of the displacement of the additive-agent diffusion plate in the circumferential direction. In addition, the configuration of the additive-agent diffusion plate is made extremely simple, and thus, it is possible to provide the additive-agent diffusion plate at extremely low cost.

In the additive-agent diffusion plate structure according to the aspect, a plurality of the additive-agent diffusion plates may be disposed in a manner such that the additive-agent diffusion plates overlap with each other when seen from the upstream side toward the downstream side in the exhaust-gas flow direction. The additive-agent diffusion plates may include at least one pair of an upstream additive agent diffusion plate and a downstream additive-agent diffusion plate disposed downstream of the upstream additive-agent diffusion plate in the exhaust-gas flow direction. The upstream additive-agent diffusion plate and the downstream additive-agent diffusion plate may be combined with each other in a manner such that each of the collision portions of the downstream additive-agent diffusion plate is positioned downstream of a corresponding one of the communication portions of the upstream additive-agent diffusion plate.

With the above-described configuration, the additive agent injected into the exhaust passage collides with each collision portion of the upstream additive-agent diffusion plate disposed upstream of the downstream additive-agent diffusion plate in the exhaust-gas flow direction, and thus, the additive agent is atomized. In addition, the additive agent, which is about to flow toward the downstream side through each communication portion of the upstream additive-agent diffusion plate, reliably collides with the corresponding collision portion of the downstream additive-agent diffusion plate, and thus, the additive agent is atomized, because each collision portion of the downstream additive-agent diffusion plate is positioned downstream of the corresponding communication portion of the upstream additive-agent diffusion plate.

In the additive-agent diffusion plate structure according to the aspect, the additive-agent diffusion plate may include a guide portion that extends in a radial direction of the exhaust passage from a base end of each of the collision portions, and guides the additive agent to each of the communication portions.

With the configuration, the additive agent, which has been atomized due to the collision with each collision portion, is guided to the communication portion by the guide portion that extends in the radial direction of the exhaust passage from the base end of the collision portion. Therefore, the route through which the additive agent flows is extended toward the radial direction, which is different from the exhaust-gas flow direction, and thus, the atomization and evaporation of the additive agent are further promoted. Thus, it is possible to more efficiently diffuse the additive agent in the exhaust gas.

In the additive-agent diffusion plate structure according to the aspect, a plurality of the additive-agent diffusion plates may be provided, and the additive-agent diffusion plates may include at least one pair of an upstream additive-agent diffusion plate and a downstream additive-agent diffusion plate disposed downstream of the upstream additive-agent diffusion plate in the exhaust-gas flow direction. The upstream additive-agent diffusion plate may include a guide piece that extends from an edge of the guide portion, which is close to the communication portion, to the downstream side in the exhaust-gas flow direction. The downstream additive-agent diffusion plate may include a guide piece that extends from the edge of the guide portion, which is close to the communication portion, to the upstream side in the exhaust-gas flow direction.

With the above-described configuration, the additive agent, which has been atomized due to the collision with each collision portion of the upstream additive-agent diffusion plate, is guided by the guide portion that extends in the radial direction of the exhaust passage from the base end of the collision portion. Then, the atomized additive agent passes through an area between each guide piece of the upstream additive-agent diffusion plate, which extends from the edge of the guide portion close to the communication portion toward the downstream side in the exhaust-gas flow direction, and the corresponding collision portion of the downstream additive-agent diffusion plate. Then, the additive agent is guided in the direction orthogonal to the exhaust-gas flow direction by the guide portion of the downstream additive-agent diffusion plate. Then, the additive agent is guided toward the downstream side in the exhaust-gas flow direction, along each guide piece, which extends from the edge of the guide portion close to the communication portion toward the upstream side in the exhaust-gas flow direction. Thus, the route through which the additive agent flows is extended in the radial direction, which is different from the exhaust-gas flow direction, by each guide portion of the upstream additive-agent diffusion plate and the downstream additive-agent diffusion plate. This further promotes the atomization and the evaporation of the additive agent. Thus, it is possible to increase the performance of diffusion the additive agent in the exhaust gas.

In the additive-agent diffusion plate structure according to the aspect, a cross section of each of the collision portions, which is taken along a plane extending in a direction in which the exhaust passage extends, may have a tapered shape, and may be substantially orthogonal to a direction in which the additive agent is injected into the exhaust passage.

With the above-described configuration, the additive agent injected into the exhaust passage collides with each collision portion from the direction substantially orthogonal to the collision portion. As a result, the largest energy is applied to the additive agent due to the collision with each collision portion of the additive-agent diffusion plate. The additive agent is atomized to finer particles using the large collision energy. Thus, it is possible to more efficiently diffuse the additive agent in the exhaust gas.

In the additive-agent diffusion plate structure according to the aspect, an injection port that injects the additive agent may be provided on a peripheral wall portion of the exhaust passage. The injection port that injects the additive agent may be provided on the peripheral wall portion of the exhaust passage at a side position.

With the above-described configuration, the injection port that injects the additive agent is provided on the peripheral wall portion of the exhaust passage. Therefore, the injection port is less likely to be affected by the temperature of the exhaust gas, as compared to the case where the injection port is located in a flow passage in the exhaust passage. Accordingly, it is not necessary to increase an injection pressure for injecting the additive agent from the injection port to prevent, for example, deposition of the additive agent. Thus, a large pump is not required, and therefore, the cost is reduced.

In the case where the injection port that injects the additive agent is provided on the peripheral wall portion of the exhaust passage at the side position, a supply route for supplying the additive agent to the injection port does not need to be protected with a heat-resistant material such as an insulator, unlike the case where the injection portion is provided on the peripheral wall at the upper position, and the supply route needs to be protected with a heat-resistant material due to heat accumulated in an upper area of the exhaust passage. Thus, a heat-resistant material is not required, and therefore, the cost is reduced.

In the additive-agent diffusion plate structure according to the aspect, the cross section of each of the collision portion may be a cross section taken along a plane orthogonal to a direction in which the exhaust passage extends. An area surrounded by an outline of the cross section may increase from the upstream side toward the downstream side in the exhaust-gas flow direction.

A second aspect of the invention relates to an additive-agent diffusion plate in an exhaust passage. The additive-agent diffusion plate includes: a plurality of collision portions, each of which protrudes toward an upstream side in an exhaust-gas flow direction in which exhaust gas flows in the exhaust passage, wherein a cross section of each of the collision portions, which is taken along a plane orthogonal to a direction in which the exhaust passage extends, has a substantially circular shape, and an area surrounded by an outline of the cross section increases from the upstream side toward a downstream side in the exhaust-gas flow direction; and a plurality of communication portions that allow the exhaust gas to flow from an area upstream of the additive-agent diffusion plate to an area downstream of the additive-agent diffusion plate.

The additive-agent diffusion plate according to the aspect may further include a guide portion that extends in a radial direction of the exhaust passage from a base end of each of the collision portions.

The additive-agent diffusion plate according to the aspect may further include a guide piece that extends in the exhaust-gas flow direction from an edge of the guide portion, which is close to the communication portion.

A third aspect of the invention relates to an exhaust system. The exhaust system includes: the additive-agent diffusion plate; an injection device that injects an additive agent into the exhaust passage. The additive agent diffusion plate is disposed in the exhaust passage at a position downstream of a position from which the additive agent is injected, in the exhaust-gas flow direction.

In the exhaust system according to the aspect, a plurality of the additive-agent diffusion plates may be disposed in a manner such that the additive-agent diffusion plates overlap each other when seen from the upstream side toward the downstream side in the exhaust-gas flow direction.

In the exhaust system according to the aspect, the additive-agent diffusion plates may include at least one pair of an upstream additive agent diffusion plate and a downstream additive-agent diffusion plate disposed downstream of the upstream additive-agent diffusion plate in the exhaust-gas flow direction. Each of the communication portions of the upstream additive-agent diffusion plate may be opposed to a corresponding one of the collision portions of the downstream additive-agent diffusion plate.

In the exhaust system according to the aspect, each of the additive-agent diffusion plates may include a guide portion that extends in a radial direction of the exhaust passage from a base end of each of the collision portions, and a guide piece that extends in the exhaust-gas flow direction from an edge of the guide portion, which is close to the communication portion. The guide piece of the upstream additive-agent diffusion plate may extend from the edge of the guide portion, which is close to the communication portion, to the downstream side in the exhaust-gas flow direction. The guide piece of the downstream additive-agent diffusion plate may extend from the edge of the guide portion, which is close to the communication portion, to the upstream side in the exhaust-gas flow direction.

In the exhaust system according to the aspect, the additive-agent diffusion plate may be disposed in a manner such that a main surface of the additive-agent diffusion plate extends in a direction substantially orthogonal to a direction in which the exhaust passage extends.

In the exhaust system according to the aspect, a direction in which the additive agent is injected into the exhaust passage may be different from the exhaust-gas flow direction. The exhaust system according to the aspect may further include an exhaust gas purification device disposed downstream of the additive-agent diffusion plate in the exhaust-gas flow direction.

In the exhaust system according to the aspect, the additive agent may contain urea; and the exhaust gas purification device may include a catalyst that reduces a nitrogen oxide.

In short, the plurality of the collision portions, with which the additive agent injected into the exhaust passage collides, protrude from the additive-agent diffusion plate toward the upstream side in the exhaust-gas flow direction, and the cross section of each collision portion increases from the upstream side toward the downstream side in the exhaust-gas flow direction. Therefore, the additive agent injected into the exhaust passage collides with each collision portion at a certain angle, and the additive agent is smoothly atomized using the energy generated due to the collision. Thus, it is possible to efficiently diffuse the additive agent in the exhaust gas. Further, even if the additive-agent diffusion plate is mounted in the exhaust passage in a manner such that the additive-agent diffusion plate is displaced in the circumferential direction, the additive agent injected into the exhaust passage smoothly collides with each collision portion. Thus, it is possible to efficiently diffuse the additive agent regardless of the displacement of the additive-agent diffusion plate in the circumferential direction. Further, the additive-agent diffusion plate has an extremely simple configuration, and therefore, it is possible to provide the additive-agent diffusion at extremely low cost.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an embodiment of the invention will be described with reference to the drawings.

Figure 1:
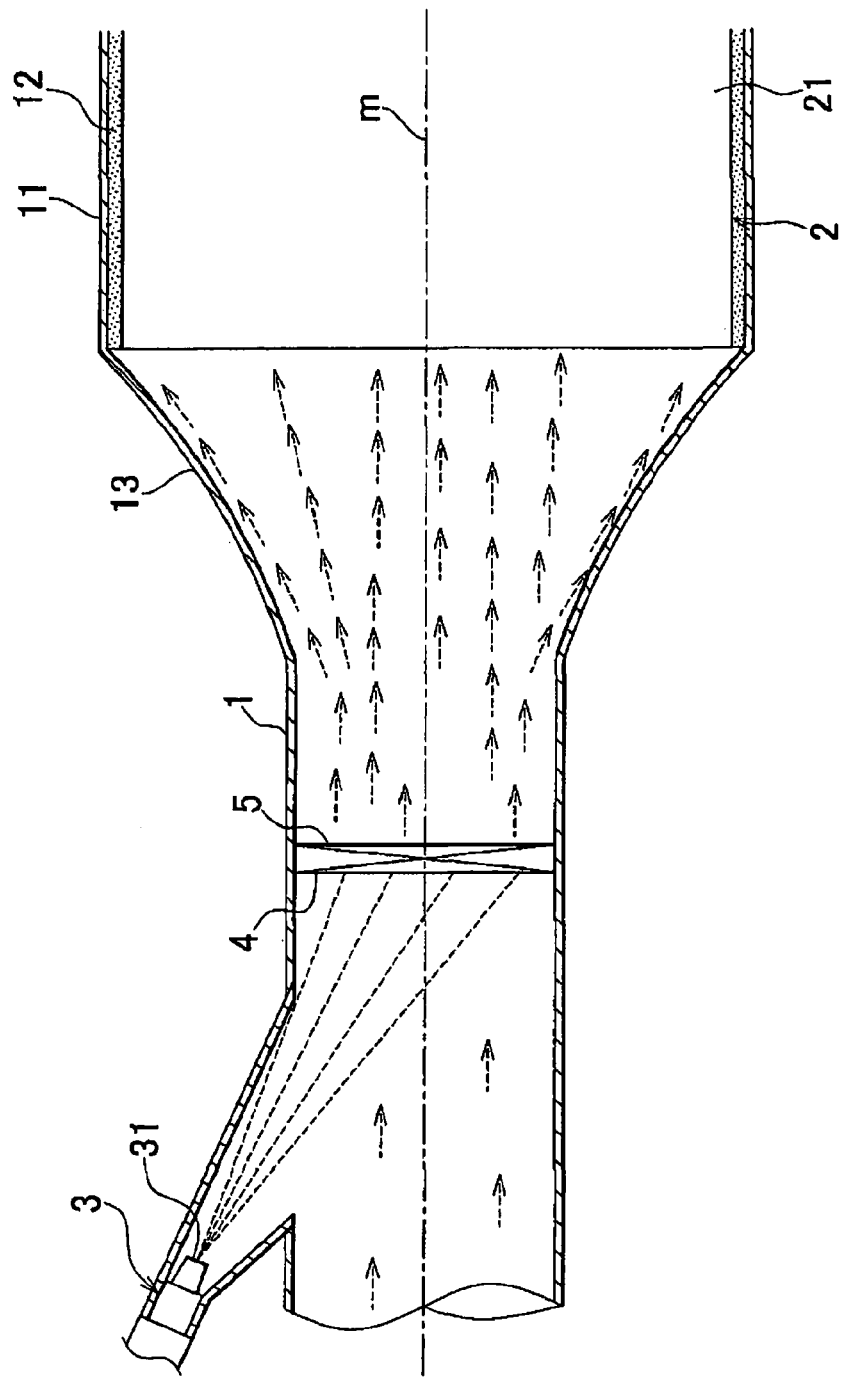
FIG. 1 is a sectional view of an area of an exhaust passage, where an upstream diffusion plate and a downstream diffusion plate according to an embodiment of the invention are provided, the sectional view seen from the side.

FIG. 1 is an exhaust passage for a diesel engine for a vehicle (an example of the engine), in which a structure of an additive-agent diffusion plate according to the embodiment of the invention is used. In FIG. 1, an exhaust gas purification device 2 is provided in an exhaust passage 1. The exhaust gas purification device 2 includes a selective reduction catalyst 21 that selectively causes nitrogen oxides (NOx) in exhaust gas to react with a reducing agent (an example of the additive agent) even in the presence of oxygen. The selective reduction catalyst 21 is provided inside a mat 12, in a large-diameter portion 11 of the exhaust passage 1, which has a large diameter. The large-diameter portion 11 is connected to another portion of the exhaust passage 1 by a warp portion 13 with a horn shape, which is warped toward an inside in a radial direction of the exhaust passage 1 from a downstream side toward an upstream side in a direction in which exhaust gas flows (hereinafter, referred to as "exhaust-gas flow direction"). In this case, the exhaust gas flowing in the exhaust passage 1 is guided along the warp portion 13 toward an outside in the radial direction of the exhaust passage 1, at an upstream portion of the warp portion 13 in the exhaust-gas flow direction. The flow of the exhaust gas is separated from the warp portion 13 at a downstream portion of the warp portion 13 in the exhaust-gas flow direction. Thus, the warp portion 13 effectively deflects the flow of the exhaust gas toward the mat 12 (toward an outside in a radial direction of the large-diameter portion 11). The exhaust-gas flow direction may be substantially parallel to a direction in which the exhaust passage 1 extends. The exhaust gas flows in the exhaust passage 1 from the upside toward the downside in the exhaust-gas flow direction.

The selective reduction catalyst 21 reduces and purifies NOx in the exhaust gas flowing in the exhaust passage 1 using a reducing agent. In the selective reduction catalyst 21, for example, a zeolitic active ingredient is carried by a monolith catalyst carrier with a honeycomb-shaped cross section, which is made of cordierite ceramic or Fe—Cr—Al-based heat-resistant steel. When the active ingredient carried by the catalyst carrier receives the reducing agent, the active ingredient is activated to effectively transforms NOx to harmless substances. In this case, a method of reducing NOx using the selective reduction catalyst 21 is referred to as Selective Catalytic Reduction (SCR). Particularly, the SCR using urea as the reducing agent is referred to as Urea SCR.

An injection nozzle 3 is provided upstream of the exhaust gas purification device 2 (the selective reduction catalyst 21) in the exhaust-gas flow direction. The injection nozzle 3 injects a urea aqueous solution (an example of the additive agent), which serves as the reducing agent). The injection nozzle 3 is provided on a peripheral wall of the exhaust passage 1 at an upper position. The urea is supplied from an injection port 31 of the injection nozzle 3 to an area upstream of the selective reduction catalyst 21 in the exhaust-gas flow direction. The urea aqueous solution and compressed air are supplied to the injection nozzle 3. The urea aqueous solution is atomized, and injected from the injection port 31. The injection nozzle 3 is obliquely directed from the upper position on the peripheral wall of the exhaust passage 1 toward the downstream side in the exhaust-gas flow direction. That is, the injection nozzle 3 is obliquely inclined toward the downstream side in the exhaust-gas flow direction at an appropriate angle (for example, substantially 45 degrees) with respect to an axis m of the exhaust passage 1. In this case, the urea aqueous solution is stored in a storage tank. The urea aqueous solution is supplied to the injection nozzle 3 via a supply pipe made of synthetic resin. In FIG. 1, dashed arrows indicate the flow of the exhaust gas when the atomized urea aqueous solution is diffused in the exhaust gas, and solid arrows indicate the flow of the exhaust gas before the urea aqueous solution is diffused.

The urea aqueous solution injected from the injection port 31 of the injection nozzle 3 is hydrolyzed due to heat of the exhaust gas in the exhaust passage 1, and thus, ammonia is easily generated. The generated ammonia reacts with NOx contained in the exhaust gas in the selective reduction catalyst 21, and thus, the ammonia is transformed to water and harmless gas. The urea aqueous solution is an aqueous solution produced by dissolving solid urea or urea powder in water. The urea aqueous solution is stored in the storage tank, and supplied to the injection nozzle 3 via the supply pipe. In addition to the urea aqueous solution, an ammonia aqueous solution and a hydrocarbon aqueous solution may be used as the reducing agent (an example of the additive agent) injected from the injection nozzle 3.

Figure 2:
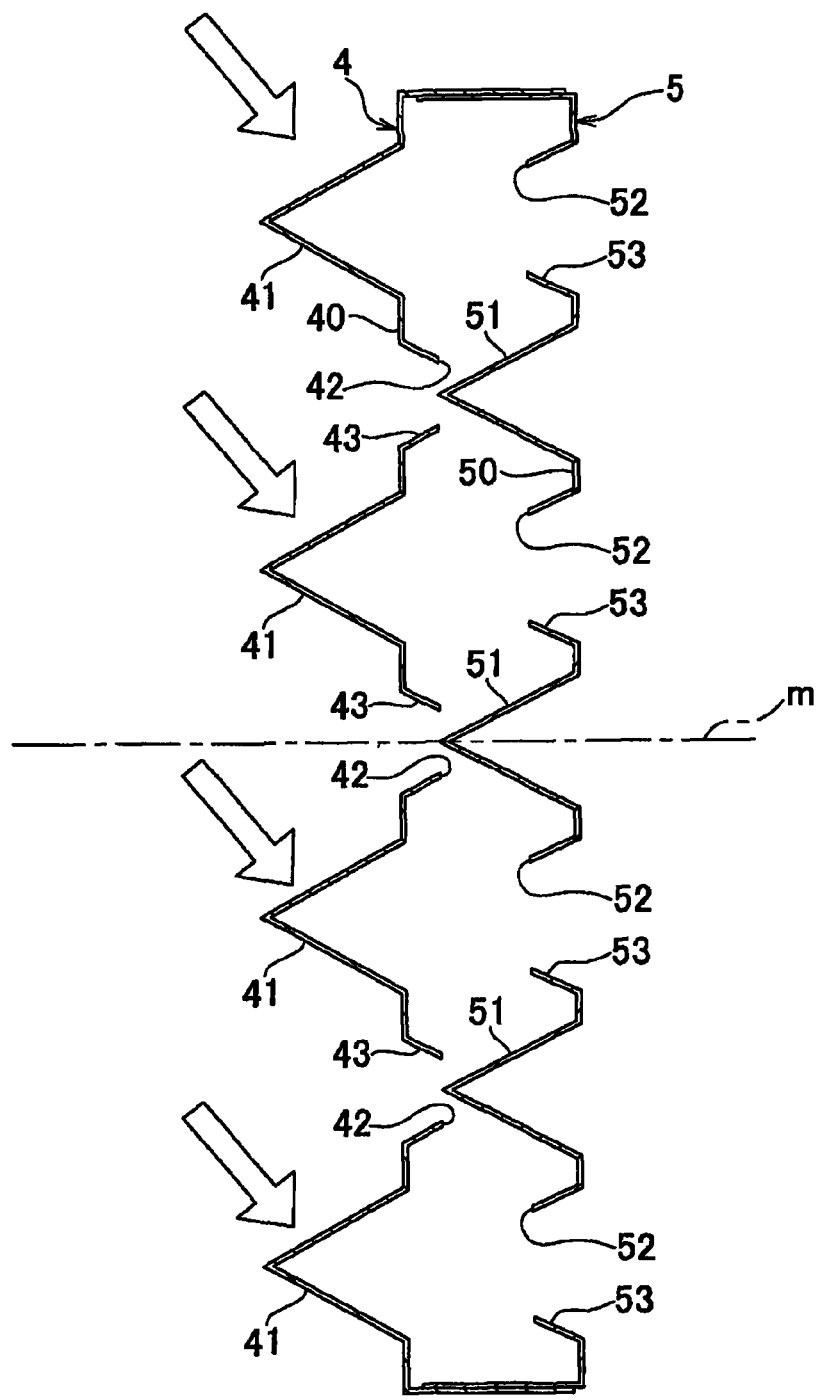
FIG. 2 is a longitudinal sectional side view of the upstream diffusion plate and the downstream diffusion plate according to the embodiment of the invention.

Diffusion plates 4 and 5 are provided directly downstream of the injection nozzle 3 in the exhaust-gas flow direction (i.e., upstream of the selective reduction catalyst 21 in the exhaust-gas flow direction). Each of the diffusion plates 4 and 5 has a substantially perfect circular shape. The diffusion plates 4 and 5 function as the additive-agent diffusion plates that diffuse the urea aqueous solution, which is injected from the injection nozzle 3 into the exhaust passage 1, in the exhaust gas. As shown in FIG. 2, the two diffusion plates 4 (an example of the upstream additive agent diffusion plate) and 5 (an example of the downstream additive-agent diffusion plate) are arranged in a manner such that the diffusion plates 4 and 5 overlap with each other when seen from the upstream side toward the downstream side in the exhaust-gas flow direction. Each of the diffusion plates 4 and 5 stands in a direction substantially perpendicular to the exhaust-gas flow direction, and occupies an entire cross section of the exhaust passage 1. An outer peripheral end of each of the diffusion plates 4 and 5 is fitted to the peripheral wall of the exhaust passage 1.

Figure 3:
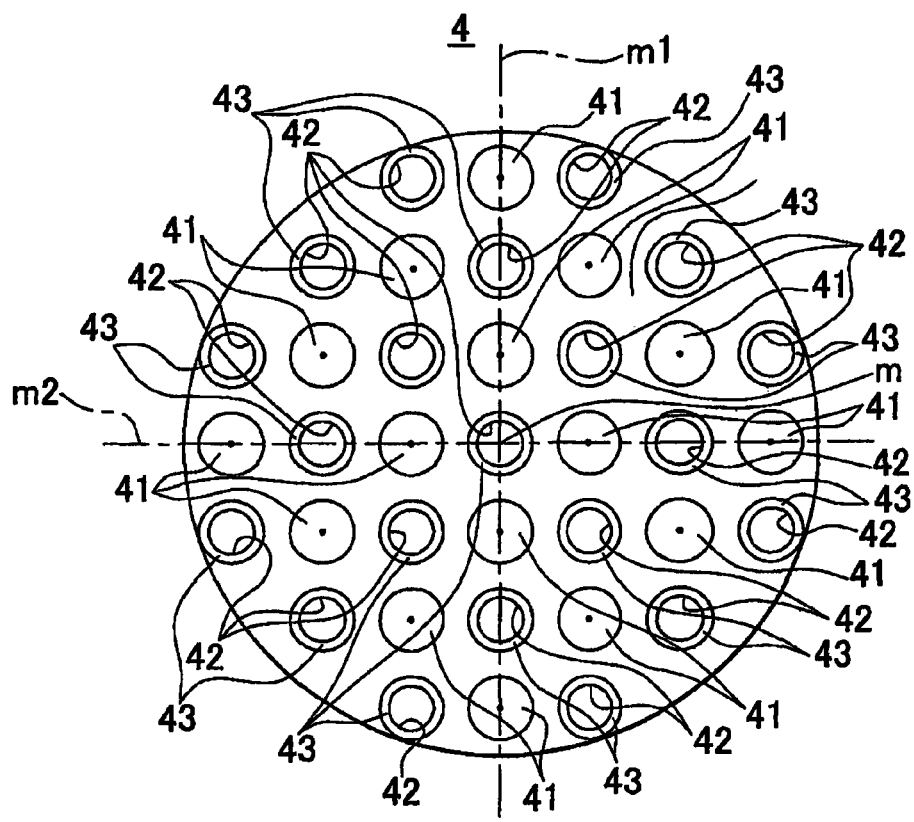
FIG. 3 is an enlarged view of the upstream diffusion plate according to the embodiment of the invention, the enlarged view seen from an upstream side in an exhaust-gas flow direction.
Figure 4:
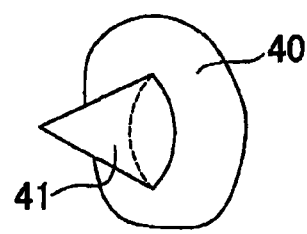
FIG. 4 is a perspective view of one collision portion of the upstream diffusion plate according to the embodiment of the invention, the perspective view seen obliquely from the side.
Figure 5:
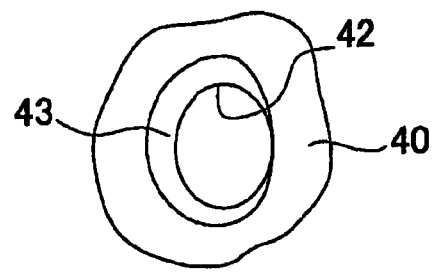
FIG. 5 is a perspective view of one communication portion of the upstream diffusion plate according to the embodiment of the invention, the perspective view seen obliquely from the side.
Figure 6:
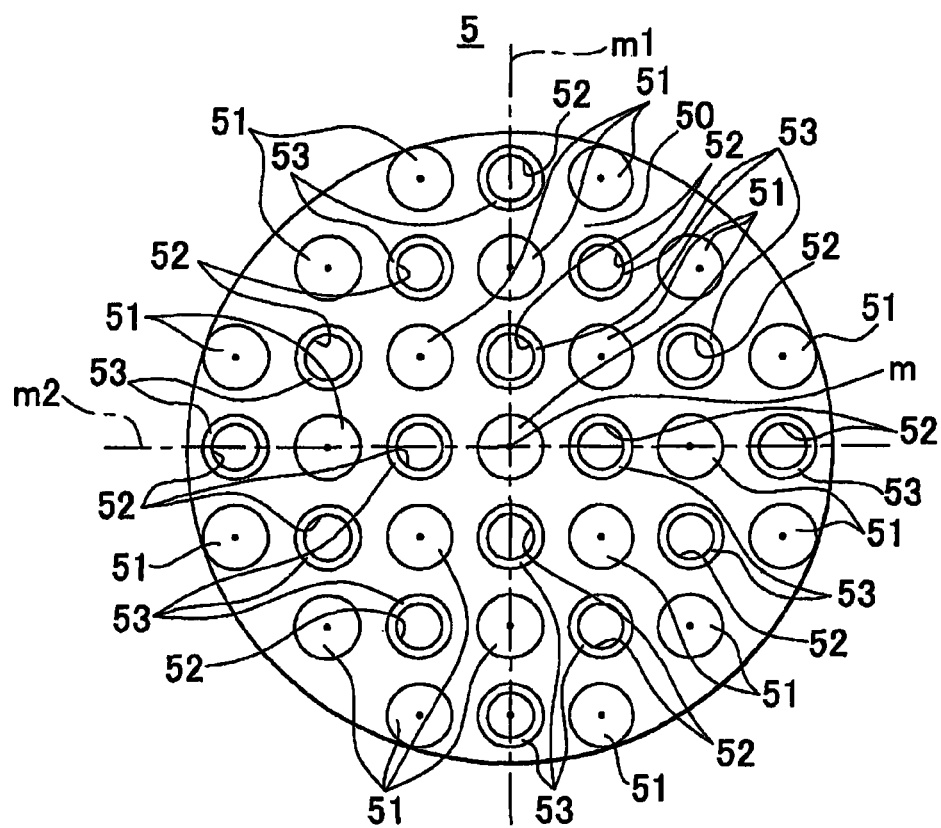
FIG. 6 is an enlarged view of the downstream diffusion plate according to the embodiment of the invention, the enlarged view seen from the upstream side in the exhaust-gas flow direction.

As shown in FIG. 3 to FIG. 5, a plurality of collision portions 41 and a plurality of communication portions 42 are provided on a plate surface 40 of the upstream diffusion plate 4 disposed upstream of the downstream diffusion plate 5 in the exhaust-gas flow direction. The urea aqueous solution injected from the injection port 31 of the injection nozzle 3 collides with the collision portions 41. The communication portions 42 allow the exhaust gas flowing in the exhaust passage 1 to flow from an area upstream of the upstream diffusion plate 4 in the exhaust-gas flow direction toward an area downstream of the upstream diffusion plate 4 in the exhaust-gas flow direction. As shown in FIG. 6, a plurality of collision portions 51 and a plurality of communication portions 52 are provided on a plate surface 50 of the downstream diffusion plate 5 disposed downstream of the upstream diffusion plate 4. The urea aqueous solution injected from the injection port 31 of the injection nozzle 3 collides with the collision portions 51. The communication portions 52 allow the exhaust gas flowing in the exhaust passage 1 to flow from the area upstream of the downstream diffusion plate 5 in the exhaust-gas flow direction to the area downstream of the downstream diffusion plate 5 in the exhaust-gas flow direction. Each collision portion 41 of the upstream diffusion plate 4 has a substantially circular cone shape, and protrudes from the plate surface 40 toward the upstream side in the exhaust-gas flow direction. Each collision portion 51 of the downstream diffusion plate 5 has a substantially circular cone shape, and protrudes from the plate surface 50 toward the upstream side in the exhaust-gas flow direction. A cross section of each of the collision portions 41 and 51, which is taken along a plane orthogonal to a direction in which the exhaust passage 1 extends, increases from the upstream side toward the downstream side in the exhaust-gas flow direction. An area surrounded by an outline of the cross section of each of the collision portions 41 and 51 increases from the upstream side toward the downstream side in the exhaust-gas flow direction. The cross section of each of the collision portions 41 and 51, which is taken along a plane orthogonal to a direction in which the exhaust passage 1 extends, has a substantially circular shape. Each communication portion 42 of the upstream diffusion plate 4 has a substantially perfect circular shape, and opens in the plate surface 40. Each communication portion 52 of downstream diffusion plate 5 has a substantially perfect circular shape, and opens in the plate surface 50.

As shown in FIG. 3, the collision portions 41 and the communication portions 42 of the upstream diffusion plate 4 are alternately disposed at predetermined intervals in a direction of a vertical line m1 that passes through the axis m of the exhaust passage 1 and in a direction of a horizontal line m2 that passes through the axis m of the exhaust passage 1. More specifically, in the upstream diffusion plate 4, a center of the communication portion 42 is disposed on the axis m of the exhaust passage 1. The collision portions 41 are disposed on the sides of the communication portion 42 disposed on the axis m of the exhaust passage 1, in the direction of the vertical line m1 and in the direction of the horizontal line m2. The collision portions 41 and the communication portion 42 are alternately disposed on the plate surface 40 in the direction of the vertical line m1 and in the direction of the horizontal line m2. As shown in FIG. 6, the collision portions 51 and the communication portions 52 of the upstream diffusion plate 5 are alternately disposed at predetermined intervals in the direction of the vertical line m1 that passes through the axis m of the exhaust passage 1 and in the direction of the horizontal line m2 that passes through the axis m of the exhaust passage 1. More specifically, a center of the communication portion 52 is disposed on the axis m of the exhaust passage 1. The collision portions 51 are disposed on the sides of the communication portion 52 disposed on the axis m of the exhaust passage 1, in the direction of the vertical line m1 and in the direction of the horizontal line m2. The collision portions 51 and the communication portion 52 are alternately disposed on the plate surface 50 in the direction of the vertical line m1 and in the direction of the horizontal line m2. As shown in FIG. 2, the upstream diffusion plate 4 and the downstream diffusion plate 5 are integrally combined with each other in a manner such that each collision portion 51 of the downstream diffusion plate 5 is positioned downstream of, and opposed to the corresponding communication portion 42 of the upstream diffusion plate 4, and each communication portion 52 of the downstream diffusion plate 5 is positioned downstream of, and opposed to the corresponding collision portion 41 of the upstream diffusion plate 4. The upstream diffusion plate 4 and the downstream diffusion plate 5, which are integrally combined with each other in the above-described state, are attached to the peripheral wall of the exhaust passage 1. In this case, a cross section of each of the collision portions 41 and 51 of the upstream diffusion plate 4 and the downstream diffusion plate 5, which is taken along a plane extending in the direction in which the exhaust passage 1 extends, has a tapered shape. An edge line of each collision portion 41 of the upstream diffusion plate 4 is substantially orthogonal to a direction in which the urea aqueous solution is injected from the injection port 31 of the injection nozzle 3 (shown by outline arrows in FIG. 2).

Figure 7:
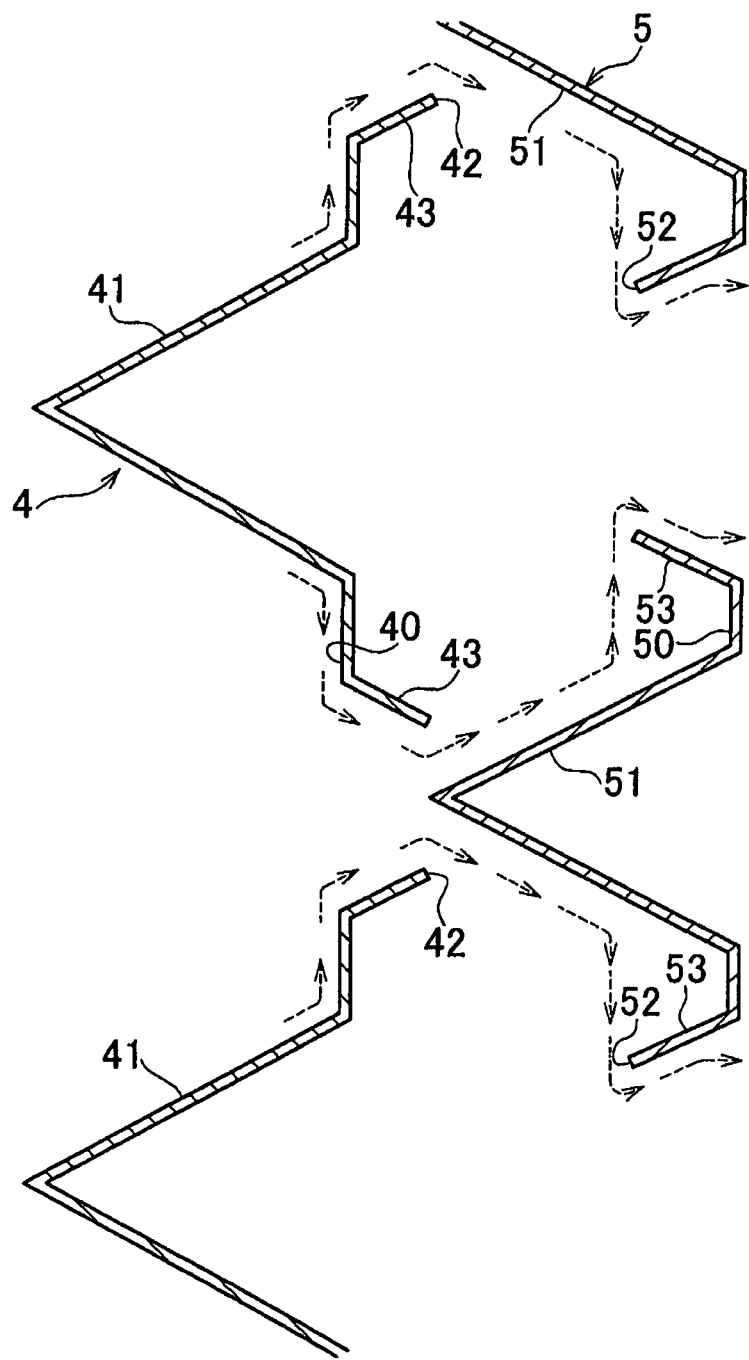
FIG. 7 is a partly cutaway sectional view of the upstream diffusion plate and the downstream diffusion plate according to the embodiment of the invention, the partly cutaway sectional view showing routes through which a urea aqueous solution is diffused.

The plate surface 40 of the upstream diffusion plate 4 extends in the radial direction of the exhaust passage 1 from a base end of each collision portion 41. The plate surface 50 of the downstream diffusion plate 5 extends in the radial direction of the exhaust passage 1 from a base end of each collision portion 51. The plate surfaces 40 and 50 function as the guide portions that guide the urea aqueous solution to the communication portions 42 and 52. Upstream guide pieces 43 are provided in the upstream diffusion plate 4. Each upstream guide piece 43 (an example of the guide piece) extends from an edge of the plate surface 40 (an example of the guide portion), which is close to the communication portion 42, toward the downstream side in the exhaust-gas flow direction. Downstream guide pieces 53 are provided in the downstream diffusion plate 5. Each downstream guide piece 53 (an example of the guide piece) extends from an edge of the plate surface 50 (an example of the guide portion), which is close to the communication portion 52, toward the upstream side in the exhaust-gas flow direction. Each upstream guide piece 43 is provided at the edge around the communication portion 42 in a manner such that a diameter of the upstream guide piece 43 decreases from the upstream side toward the downstream side in the exhaust-gas flow direction. Each downstream guide piece 53 is provided at the edge around the communication portion 52 in a manner such that a diameter of the downstream guide piece 53 decreases from the downstream side toward the upstream side in the exhaust-gas flow direction. In this case, as shown in FIG. 7, the urea aqueous solution atomized due to the collision with each collision portion 41 of the upstream diffusion plate 4 (shown by dashed arrows in FIG. 7) is guided in a direction orthogonal to the exhaust-gas flow direction by the plate surface 40 that extends in the radial direction of the exhaust passage 1 from the base end of each collision portion 41. Then, the atomized urea aqueous solution passes thorough an area between each upstream guide piece 43, which extends from the edge of the plate surface 40 close to the communication portion 42 toward the downstream side in the exhaust-gas flow direction, and the corresponding collision portion 51 of the downstream diffusion plate 5. Then, the atomized urea aqueous solution is guided in the direction orthogonal to the exhaust-gas flow direction by the plate surface 50, which extends from the base end of each collision portion 51 in the radial direction of the exhaust passage 1. Then, the atomized urea aqueous solution is guided toward the downstream side in the exhaust-gas flow direction, along each downstream guide piece 53, which extends from the edge of the plate surface 50 close to the communication portion 52 toward the upstream side in the exhaust-gas flow direction.

Thus, in the above-described embodiment, the urea aqueous solution injected from the injection port 31 of the injection nozzle 3 into the exhaust passage 1 collides with each collision portion 41, which protrudes from the plate surface 40 of the upstream diffusion plate 4 toward the upstream side in the exhaust-gas flow direction, and thus, the urea aqueous solution is diffused. Each collision portion 40 has a substantially circular cone shape. That is, the cross section of each collision portion 40, which is taken along the plane orthogonal to the direction in which the exhaust passage 1 extends, increases from the upstream side toward the downstream side in the exhaust-gas flow direction. Also, the area surrounded by the outline of the cross section increases from the upstream side toward the downstream side in the exhaust-gas flow direction. Therefore, the urea aqueous solution injected into the exhaust passage 1 collides with each collision portion 41 from the direction orthogonal to the collision portion 41. The largest energy is applied to the urea aqueous solution due to the collision. The urea aqueous solution is efficiently atomized using the largest collision energy. The urea aqueous solution, which is about to flow toward the downstream side after passing through each communication portion 42, also reliably collides with the collision portion 51 and the urea aqueous solution is atomized, because each collision portion 51 of the downstream diffusion plate 5 is positioned downstream of the corresponding communication portion 42 of the upstream diffusion plate 4. The urea aqueous solution, which is atomized due to the collision with each collision portion 41 of the upstream diffusion plate 4, is guided in the direction orthogonal to the exhaust-gas flow direction by the plate surface 40, which extends in the radial direction of the exhaust passage 1 from the base end of each collision portion 41. Then, the atomized urea aqueous solution passes thorough the area between each upstream guide piece 43, which extends from the edge of the plate surface 40 close to the communication portion 42 toward the downstream side in the exhaust-gas flow direction, and the corresponding collision portion 51 of the downstream diffusion plate 5. Then, the atomized urea aqueous solution is guided in the direction orthogonal to the exhaust-gas flow direction by the plate surface 50, which extends in the radial direction of the exhaust passage 1 from the base end of each collision portion 51. Then, the atomized urea aqueous solution is guided toward the downstream side in the exhaust-gas flow direction, along each downstream guide piece 53, which extends from the edge of the plate surface 50 close to the communication portion 52 toward the upstream side in the exhaust-gas flow direction.

Thus, the urea aqueous solution is smoothly atomized due to the collision with each of the collision portions 41 and 51 of the upstream diffusion plate 4 and the downstream diffusion plate 5. In addition, the routes, through which the urea aqueous solution is diffused, are extended in the radial direction orthogonal to the exhaust-gas flow direction by the plate surfaces 40 and 50 of the upstream diffusion plate 4 and the downstream diffusion plate 5. This further promotes the atomization and evaporation of the urea aqueous solution. Thus, it is possible to effectively increase the performance of diffusing the urea aqueous solution in the exhaust gas.

Further, the upstream diffusion plate 4 and the downstream diffusion plate 5 are integrally combined with each other in advance. Therefore, even if the upstream diffusion plate 4 and the downstream diffusion plate 5 are combined with each other and mounted in the exhaust passage 1 in a manner such that the diffusion plates 4 and 5 are displaced in the circumferential direction, the urea aqueous solution injected into the exhaust passage 1 smoothly collides with each of the collision portions 41 and 51. Thus, even if the upstream diffusion plate 4 and the downstream diffusion plate 5 are combined with each other and mounted in the exhaust passage 1 in a manner such that the diffusion plates 4 and 5 are displaced in the circumferential direction, it is possible to efficiently diffuse the urea aqueous solution, regardless of the displacement. In addition, in the upstream diffusion plate 4, the plurality of collision portions 41, the plurality of communication portions 42, and the plurality of upstream guide pieces 43 are provided on the plate surface 40. In the downstream diffusion plate 5, the plurality of collision portions 51, the plurality of communication portions 52, and the plurality of upstream guide pieces 53 are provided on the plate surface 50. Thus, each of the upstream diffusion plate 4 and the downstream diffusion plate 5 has an extremely simple configuration. Thus, it is possible to provide each of the upstream diffusion plate 4 and the downstream diffusion plate 5 at extremely low cost.

The invention is not limited to the above-described embodiment. Various modifications may be made in the scope of the invention. For example, although the injection nozzle 3 is provided on the peripheral wall of the exhaust passage 1 at the upper position in the above-described embodiment, the injection nozzle (nozzle port) may be provided on the peripheral wall of the exhaust passage at a side position, for example, a position on a horizontal line that passes through the axis of the exhaust passage. In this case, a supply pipe for supplying the urea aqueous solution to the injection port at the side position on the peripheral wall of the exhaust passage is smoothly cooled by air flowing along an outside of the peripheral wall of the exhaust passage when a vehicle travels. Therefore, the supply pipe for supplying the urea aqueous solution to the injection port does not need to be protected with a heat-resistant material such as an insulator, unlike the case where the injection portion is provided on the peripheral wall at the upper position, and the supply pipe needs to be protected with a heat-resistant material due to heat accumulated in an upper area of the exhaust passage. Thus, a heat-resistant material for protecting the supply pipe is not required, and the cost is reduced.

In the above-described embodiment, the upstream guide piece 43 of the upstream diffusion plate 4 extends in the direction different from the direction in which the downstream guide piece 53 of the downstream diffusion plate 5 extends. However, the upstream guide piece 43 of the upstream diffusion plate 4 and the downstream guide piece 53 of the downstream diffusion plate 5 may extend in the same direction. Also, in the above-described embodiment, the two diffusion plates, that is, the upstream diffusion plate 4 and the downstream diffusion plate 5, which are combined with each other in advance, are used. However, only one diffusion plate, or three or more diffusion plates combined together may be used.

Also, in the above-described embodiment, the upstream diffusion plate 4 and the downstream diffusion plate 5 diffuse the urea aqueous solution injected from the injection port 31 of the injection nozzle 3 into the exhaust gas, at a position upstream of the exhaust gas purification device 2 including the selective reduction catalyst 21. However, an exhaust gas purification device including a zeolitic catalyst may be provided in the exhaust passage, and a diffusion plate may diffuse the fuel component (HC component) injected from the injection port of the injection nozzle into the exhaust gas, at a position upstream of the exhaust gas purification device.

In the above-described embodiment, the upstream diffusion plate 4 and the downstream diffusion plate 5, which are combined with each other in advance, are used. A face-to-face distance between the upstream diffusion plate and the downstream diffusion plate may be set to any value. The distance may be set taking into account, for example, exhaust gas emission characteristic of the engine.

Further, in the above-described embodiment, the structure of the additive-agent diffusion plate is used in the exhaust passage for the diesel engine. However, the structure of the additive-agent diffusion plate may be used in an exhaust passage for a direct injection gasoline engine from which NOx may be discharged together with the exhaust gas depending on the operating condition.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. An additive-agent diffusion device, comprising:
an exhaust passage for an engine;
an additive agent injection nozzle disposed in the exhaust passage upstream of an exhaust gas purification device in an exhaust-gas flow direction in which the exhaust gas flow; and
an additive-agent diffusion plate disposed in the exhaust passage directly downstream of the injection nozzle, and upstream of the exhaust gas purification device, wherein the diffusion plate includes:
a plurality of imperforate collision portions with which an additive agent injected into the exhaust passage collide; and
a plurality of apertures between each of the plurality of collision portions that allow exhaust gas flowing in the exhaust passage to flow from an area upstream of the additive-agent diffusion plate in an exhaust-gas flow direction, to an area downstream of the additive-agent diffusion plate in the exhaust-gas flow direction;
wherein:
each of the imperforate collision portions protrudes toward an upstream side in the exhaust-gas flow direction, and a cross section of each of the collision portions increases from the upstream side toward a downstream side in the exhaust-gas flow direction.

2. The additive-agent diffusion device according to claim 1, wherein:
a plurality of the additive-agent diffusion plates are disposed in a manner such that the additive-agent diffusion plates overlap with each other when seen from the upstream side toward the downstream side in the exhaust-gas flow direction;
the additive-agent diffusion plates include at least one pair of an upstream additive agent diffusion plate and a downstream additive-agent diffusion plate disposed downstream of the upstream additive-agent diffusion plate in the exhaust-gas flow direction;
the upstream additive-agent diffusion plate and the downstream additive-agent diffusion plate are combined with each other in a manner such that each of the collision portions of the downstream additive-agent diffusion plate is positioned directly downstream of a corresponding one of the apertures of the upstream additive-agent diffusion plate.

3. The additive-agent diffusion device according to claim 1, wherein the additive-agent diffusion plate includes a guide portion that extends in a radial direction of the exhaust passage from a base end of each of the collision portions, and guides the additive agent to each of the apertures.

4. The additive-agent diffusion device according to claim 3, wherein:
a plurality of the additive-agent diffusion plates are provided, and the additive-agent diffusion plates include at least one pair of an upstream additive-agent diffusion plate and a downstream additive-agent diffusion plate disposed downstream of the upstream additive-agent diffusion plate in the exhaust-gas flow direction;
the upstream additive-agent diffusion plate includes a guide piece that extends from an edge of the guide portion, which is close to the aperture, to the downstream side in the exhaust-gas flow direction; and
the downstream additive-agent diffusion plate includes a guide piece that extends from the edge of the guide portion, which is close to the aperture, to the upstream side in the exhaust-gas flow direction.

5. The additive-agent diffusion device according to claim 1, wherein each of the collision portions has a conical shape, and is substantially orthogonal to a direction in which the additive agent is injected into the exhaust passage.

6. The additive-agent diffusion device according to claim 1, wherein the additive agent injection nozzle is provided on a peripheral wall of the exhaust passage.

7. The additive-agent diffusion device according to claim 6, wherein the injection nozzle is provided on the peripheral wall portion of the exhaust passage at a side position.

8. An additive-agent diffusion device, comprising:
an exhaust passage for an engine;
an additive agent injection nozzle disposed in the exhaust passage upstream of an exhaust gas purification device in an exhaust-gas flow direction in which the exhaust gas flows; and
an additive-agent diffusion plate disposed in the exhaust passage directly downstream of the injection nozzle, and upstream of the exhaust gas purification device, the additive-agent diffusion plate comprising:
a plurality of imperforate conical collision portions, each of which protrudes toward an upstream side in an exhaust-gas flow direction in which exhaust gas flows in the exhaust passage; and
a plurality of apertures between each of the plurality of collision portions that allow the exhaust gas to flow from an area upstream of the additive-agent diffusion plate to an area downstream of the additive-agent diffusion plate.

9. The additive-agent diffusion device according to claim 8, further comprising
a guide portion that extends in a radial direction of the exhaust passage from a base end of each of the collision portions.

10. The additive-agent diffusion device according to claim 9, further comprising
a guide piece that extends in the exhaust-gas flow direction from an edge of the guide portion.

11. An exhaust purification system comprising:
the additive-agent diffusion device according to claim 8, wherein a plurality of the additive-agent diffusion plates are disposed in a manner such that the additive-agent diffusion plates overlap each other when seen from the upstream side toward the downstream side in the exhaust-gas flow direction.

12. The exhaust purification system according to claim 11, wherein:
the additive-agent diffusion plates include at least one pair of an upstream additive agent diffusion plate and a downstream additive-agent diffusion plate disposed downstream of the upstream additive-agent diffusion plate in the exhaust-gas flow direction; and
each of apertures of the upstream additive-agent diffusion plate is opposed to a corresponding one of the imperforate collision portions of the downstream additive-agent diffusion plate.

13. The exhaust purification system according to claim 12, wherein:
each of the additive-agent diffusion plates further includes a guide portion that extends in a radial direction of the exhaust passage from a base end of each of the collision portions, and a guide piece that extends in the exhaust-gas flow direction from an edge of the guide portion;
the guide piece of the upstream additive-agent diffusion plate extends from the edge of the guide portion to the downstream side in the exhaust-gas flow direction; and
the guide piece of the downstream additive-agent diffusion plate extends from the edge of the guide portion to the upstream side in the exhaust-gas flow direction.

14. The exhaust purification system according to claim 11, wherein the additive-agent diffusion plate is disposed in a manner such that a main surface of the additive-agent diffusion plate extends in a direction substantially orthogonal to a direction in which the exhaust passage extends.

15. The exhaust purification system according to claim 11, wherein a direction in which the additive agent is injected into the exhaust passage is different from the exhaust-gas flow direction.

16. The exhaust purification system according to claim 11, further comprising
an exhaust gas purification device disposed downstream of the additive-agent diffusion plate in the exhaust-gas flow direction.

17. The exhaust purification system according to claim 16, wherein:
the additive agent contains urea; and
the exhaust gas purification device includes a catalyst that reduces a nitrogen oxide.

* * * * *